United States Patent
Velarde et al.

(10) Patent No.: US 9,420,248 B2
(45) Date of Patent: Aug. 16, 2016

(54) MULTI-LED CAMERA FLASH FOR COLOR TEMPERATURE MATCHING

(71) Applicant: QUALCOMM Incorporated, San Diego, CA (US)

(72) Inventors: Ruben Manuel Velarde, Chula Vista, CA (US); Nathaniel Jay Tobias Salazar, San Diego, CA (US); Szepo Robert Hung, Carlsbad, CA (US); Sandeep Dhar, San Diego, CA (US); Hengzhou Ding, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/491,627

(22) Filed: Sep. 19, 2014

(65) Prior Publication Data

US 2016/0088278 A1  Mar. 24, 2016

(51) Int. Cl.
| | |
|---|---|
| *H04N 5/222* | (2006.01) |
| *H04N 9/73* | (2006.01) |
| *H04N 5/235* | (2006.01) |
| *G03B 15/03* | (2006.01) |
| *G03B 15/05* | (2006.01) |

(52) U.S. Cl.
CPC .............. *H04N 9/735* (2013.01); *G03B 15/03* (2013.01); *G03B 15/05* (2013.01); *H04N 5/2354* (2013.01); *G03B 2215/0503* (2013.01); *G03B 2215/0567* (2013.01); *G03B 2215/0571* (2013.01)

(58) Field of Classification Search
CPC .................................................. H04N 5/2354
USPC ................................................. 348/370, 371
See application file for complete search history.

(56) References Cited

U.S. PATENT DOCUMENTS

| | | | |
|---|---|---|---|
| 7,772,786 B2 * | 8/2010 | Hosoda | A61B 1/00034 315/291 |
| 7,995,911 B2 | 8/2011 | Butterworth | |
| 8,515,275 B2 | 8/2013 | Machida et al. | |

(Continued)

FOREIGN PATENT DOCUMENTS

| | | |
|---|---|---|
| WO | WO-2006129777 A1 | 12/2006 |
| WO | WO-2009074938 A2 | 6/2009 |

OTHER PUBLICATIONS

Panzarino M., "A Photographer's Take on The iPhone 5S Camera," TechCrunch, Sep 12, 2013, retrieved from URL: http://techcrunch.com/2013/09/12/a-photographers-take-on-the-iphone-5s-camera/, 29 pages.

(Continued)

*Primary Examiner* — Joel Fosselman
(74) *Attorney, Agent, or Firm* — Paradice and Li LLP

(57) ABSTRACT

Certain aspects relate to systems and techniques for color temperature analysis and matching. For example, three or more camera flash LEDs of different output colors can be used to match any of a range of ambient color temperatures in a non-linear space on the black body curve. The scene color temperature can be analyzed in a preliminary image by determining actual sensor R/G and B/G ratios, enabling more accurate matching of foreground flash lighting to background lighting by the reference illuminant for subsequent white balance processing. The current provided to, and therefore brightness emitted from, each LED can be individually controlled based on the determined sensor response to provide a dynamic and adaptive mix of the output colors of the LEDs.

27 Claims, 9 Drawing Sheets

(56) References Cited

U.S. PATENT DOCUMENTS

| | | |
|---|---|---|
| 8,619,155 B2 | 12/2013 | Nakagawara |
| 8,634,021 B2 | 1/2014 | Kawakami |
| 8,687,109 B2 | 4/2014 | Kametani et al. |
| 2003/0025822 A1* | 2/2003 | Shimada ............ H04N 9/735 348/370 |
| 2006/0067668 A1 | 3/2006 | Kita |
| 2006/0250519 A1* | 11/2006 | Kawakami ............ G03B 15/05 348/371 |
| 2011/0115833 A1 | 5/2011 | Shimoyama |
| 2015/0002735 A1 | 1/2015 | Moskovchenko |
| 2015/0181101 A1 | 6/2015 | Ciudad et al. |

OTHER PUBLICATIONS

Partial International Search Report—PCT/US2015/045933—ISA/EPO—Dec. 9, 2012.

International Search Report and Written Opinion—PCT/US2015/045933—ISA/EPO—Feb. 11, 2016.

* cited by examiner

MULTI-LED CAMERA FLASH FOR COLOR TEMPERATURE MATCHING

TECHNICAL FIELD

The systems and methods disclosed herein are directed to image capture systems and techniques, and, more particularly, to color temperature analysis and matching.

BACKGROUND

Any light source can be uniquely characterized by its spectrum plot, that is, the amount of light at each wavelength. Correlated color temperature (CCT) is used to characterize the light in the measurement of black body radiator's color hue. Therefore CCT is suited for characterizing a light source that is indeed close to black body radiator in terms of light spectrum, i.e., those on a line from reddish-orange to yellow and more or less white to bluish white. CCT is not suited for measuring the color temperature of a green or purple light, for example, because their hue and spectrum is far from black body radiator. Color temperature can be a useful description of light for photographic applications, as light sources such as daylight and tungsten bulbs closely mimic the distribution of light created by blackbodies, although others such as fluorescent and most commercial lighting depart from blackbodies significantly.

A digital camera is typically equipped with a camera flash unit or sub-unit calibrated to a single color that approximates sunlight. In conditions of low ambient light or scene illumination, the camera flash unit emits a flash of artificially generated light during image capture. Together with the available ambient light, the flash light emitted from the camera flash unit increases overall scene illumination to allow for brighter images. In photography, the type of ambient lighting can dictate the CCT of the image scene (i.e., daylight, fluorescent light, tungsten, etc.). When flash is used, the output color of the flash may not match the CCT of the image scene, resulting in images generated under different ambient light conditions exhibiting particular color casts. When the color temperature of ambient light and the emitted flash color do not match, unnatural-looking white balance such as varying color casts in foreground and background objects can occur in captured images.

In some cases, a dual color light-emitting diode (LED) flash can be matched to a determined CCT of ambient light in order to enable the camera's white balance algorithm to perform better. However, use of two LEDs only allows a linear range of possible colors of the output lighting, better matching some ambient lighting but excluding others. As such, color casts in captured images can be reduced but may not eliminated, in all cases, because the ability to match output lighting color to ambient light color temperature is limited. In some examples, if the output color of the flash does not match the color temperature of the ambient lighting, this can result in a captured image with different color casts from the flash and the ambient light, complicating performing white balance on the captured image. In addition, it can be difficult to select the two LEDs to match the sensor due to manufacturing variations for both the LED output colors and the sensor response. Further, use of determined CCT of ambient light to determine the combined output color of the LEDs may not provide the most suitable flash output color for the camera's white balance process.

SUMMARY

The aforementioned problems, among others, are addressed in some embodiments by the color temperature analysis and matching systems and techniques described herein. For example, three or more camera flash LEDs can be used to match any of a range of ambient lighting colors in a higher dimensional space. The three or more LEDs may each be selected to have a different output color, and these colors can be selected to enable fine tuning of output color of the LED flash unit through a range of combined output colors matching all or substantially all common ambient light sources. The scene color temperature can be analyzed in a preliminary image by determining actual sensor response in terms of R/G and B/G ratios, enabling more accurate matching of foreground flash lighting to background lighting by the reference illuminant for subsequent white balance processing. The current provided to, and therefore brightness emitted from, each LED can be individually controlled based on the determined sensor response for a dynamic and adaptive mix of the output colors of the LEDs.

Accordingly, one aspect relates to an image capture system comprising an image sensor configured to capture image data of a target image scene; a flash unit comprising a plurality of LEDs; and a processor configured to receive image data comprising a preliminary image of the target image scene, determine, based on sensor response data of the preliminary image, a correlated color temperature of a reference illuminant of the target image scene, determine a current amount for each of the plurality of LEDs such that a combined output color of the plurality of LEDs matches or approximately matches the correlated color temperature of the reference illuminant, and capture a final image of the target image scene by activating each of the plurality of LEDs at the current amount.

Another aspect relates to a method of providing a determined color temperature flash output, the method comprising receiving image data comprising a preliminary image of a target image scene, determining, based on sensor response data of the preliminary image, a correlated color temperature of a reference illuminant of the target image scene, determining a flash output color based on a current amount for each of a plurality of LEDs in a flash unit such that the flash output color of the plurality of LEDs matches or approximately matches the correlated color temperature of the reference illuminant, and capturing a final image of the target image scene by activating each of the plurality of LEDs at the current amount to provide the flash output color.

Another aspect relates to non-transitory computer-readable medium storing instructions that, when executed, cause one or more processors to perform operations comprising receiving image data comprising a preliminary image of a target image scene; determining, based on sensor response data of the preliminary image, a correlated color temperature of a reference illuminant of the target image scene; determining a current amount for each of a plurality of LEDs in a flash unit such that a combined output color of the plurality of LEDs matches or approximately matches the correlated color temperature of the reference illuminant; and capturing a final image of the target image scene by activating each of the plurality of LEDs at the current amount to provide the combined output color.

Another aspect relates to a method of manufacturing an image capture apparatus, the method comprising selecting an image sensor; selecting a plurality of LEDs for a flash module; providing a memory in communication with the image sensor; and populating a reference illuminant data repository for storage in the memory based at least partly on determining sensor responses to a plurality of reference illuminants.

Another aspect relates to a device for providing a determined color temperature flash output, the device comprising means for receiving image data comprising a preliminary image of a target image scene; means for determining, based on sensor response data of the preliminary image, a correlated color temperature of a reference illuminant of the target image scene; means for determining a flash output color based on a current amount for each of a plurality of LEDs in a flash unit such that the flash output color of the plurality of LEDs matches or approximately matches the correlated color temperature of the reference illuminant; and means for capturing a final image of the target image scene by activating each of the plurality of LEDs at the current amount to provide the flash output color. The device can further include means for determining R/G and B/G sensor response ratios for a predetermined region of the preliminary image, and means for identifying pixels corresponding to a gray area in a background portion of the preliminary image, wherein at least some of the pixels corresponding to the gray area comprise the predetermined region.

BRIEF DESCRIPTION OF THE DRAWINGS

The disclosed aspects will hereinafter be described in conjunction with the appended drawings and appendices, provided to illustrate and not to limit the disclosed aspects, wherein like designations denote like elements.

DETAILED DESCRIPTION

Introduction

Figure 1A:
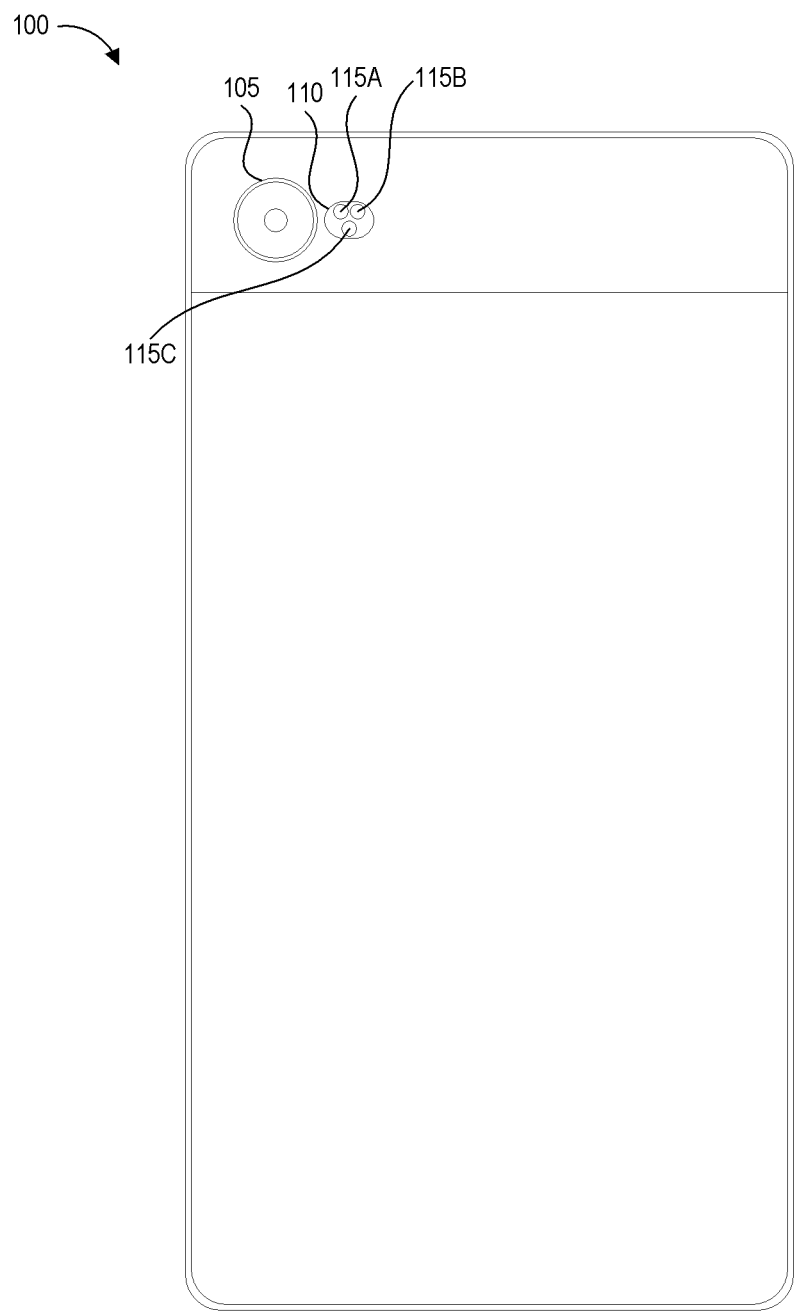
FIGS. 1A through 1C illustrate various embodiments of an image capture device having a multi-LED flash unit.

Embodiments of the disclosure relate to systems and techniques for analysis of sensor response representing color temperature of a reference illuminant and matching of a flash unit output color to the determined sensor response. For example, a camera flash unit can include three or more LEDs, each selected to have a different output color, wherein each of the LEDs can be adjustably illuminated to enable fine tuning of the output color of the flash unit to match the sensor's determined response to the color temperature characteristics of the ambient light of the image scene (the "reference illuminant"). The current provided to, and therefore brightness emitted from, each LED can be individually controlled for a dynamic and adaptive mix of the output colors of the LEDs. The scene color temperature analysis of the color temperature matching techniques described herein uses actual sensor response in terms of R/G and B/G ratios in a preliminary image to determine the sensor response to the color temperature of a reference illuminant, and then uses the sensor response to determine what output LED color to generate, enabling more accurate matching of foreground flash lighting to background lighting by the reference illuminant.

When using multiple LEDs for controlling output flash color characteristics, the ambient light in the scene background may first be analyzed to determine the reference illuminant, that is, the color characteristics of the dominant black body radiation temperature color in the background. Typically in color temperature matching processes the CCT of the reference illuminant is determined. However, white balance (WB) processes determine the sensor response of the current lighting in terms of R/G and B/G ratios in a captured image and then attempt to apply a different gain to each of the R, G and B (red, green, and blue) channels so that a grey color captured under the current lighting will have a grey response (R=G=B) in the final image. As such, WB processes are not necessarily best served by an exact match of the calculated CCT value of the reference illuminant with an estimated color output of the flash. Rather, in accordance with the color matching techniques discussed herein, captured images may appear more uniformly white balanced when the LED flash output and ambient lighting behave the same in terms of sensor response, which can be characterized by R/G and B/G ratios.

To achieve this match, the color matching techniques described herein examine the R/G and B/G ratios, as these uniquely represent the sensor response that affects white balance. Sensor response matching is much more accurate than matching of calculated ambient CCT for purposes of determining flash output color. Further, calculated CCT of ambient lighting (also referred to herein as a "reference illuminant") is a one-dimensional value, while white balance operates based on two-dimensional values (R/G and B/G sensor response ratios).

In some embodiments, a preliminary image can be captured, for example through use of a pre-flash or as a preview image, and the preliminary image can be analyzed to determine R/G and B/G ratios. Some embodiments can determine pixels corresponding to a foreground and pixels corresponding to a background of the preliminary image and analyze the background pixels to determine R/G and B/G ratios. Accordingly, the flash unit color output will be selected to match the background of the image scene, advantageously providing for more uniform white balance, as the flash will illuminate the foreground of the image scene in the captured image and the reference illuminant will continue to illuminate the background of the image scene in the captured image.

The determined R/G and B/G sensor response ratios can be used to determine currents for each of the flash unit LEDs. By illuminating the various LEDs of different colors with different levels of brightness, the output color of the flash unit can be adaptively mixed so that the combined LED color will have the same or a similar sensor response (R/G and B/G ratios) when compared to the ambient lighting. This can provide for more accurate matching of foreground flash lighting to background lighting by the reference illuminant, and therefore also providing for more uniform color cast in the captured image after subsequent white balance processing. Accordingly, foreground objects illuminated by flash will appear more appropriately white balanced when viewed in a captured image together with background objects illuminated by the reference illuminant.

Further, use of R/G and B/G sensor responses in color matching enables compensation for manufacturing variability in one or both of the LED and sensor. For example, actual sensor response can vary from specified manufacturing response by up to 20%. In addition, actual LED output color can shift away from the expected color. In some cases, the sensor response and LED output color may shift in opposite directions, leading to undesirable color casts in images captured using that specific sensor and LED combination, even if color temperature matching using determined CCT is used. Accordingly, in some embodiments, after a sensor and LEDs are selected for a particular camera, the camera can be tested under a variety of reference illuminants, for example representing typical lighting conditions, to build a profile of the R/G and B/G sensor response ratios under such reference illuminants. The LEDs, individually and/or in combination, can be tested to determine the selected sensor's actual response to the LED's actual color output. Accordingly, a profile (for example a look-up table) can be built representing a correlation between sensor response to a particular reference illuminant and the corresponding current that should be supplied to each LED in order to achieve uniform or substantially uniform white balance between the foreground and background of an image captured with the specific sensor-flash unit pair.

In some embodiments, a first LED can be chosen that has cool (i.e., blue or bluish) color (high CCT around 5500-6500K), while a second LED can be chosen that has warm (i.e., yellow or yellowish, red or reddish, etc.) color (low CCT around 2000-2500K). These two LEDs may be activated, at varying current levels, under some or most reference illuminants. In one example, an additional LED can be chosen having a green (or greenish) or purple (or purplish) color, and the additional LED can be activated, at varying current levels, in order to bias the linear range of the combination of the first and second LEDs toward reference illuminants outside of that linear range. The additional LED may be selected to have a color requiring minimal current for biasing the linear range of the combination of the first and second LEDs. In some examples, both a greenish LED and a purplish LED can be combined with the first and second LEDs.

In some embodiments, the techniques for analysis of sensor response to color temperature of a reference illuminant and matching of a flash unit output color to the determined sensor response (collectively referred to as "color matching techniques") may be performed automatically by the image capture device. When a preview image is used for sensor response analysis, the color matching techniques may be performed in real-time, that is, performed while creating no noticeable delay from the perspective of a user of the image capture device. In some embodiments, the combined output color of the flash unit may be user-configurable in order to achieve intentional and desirable color casts in captured images. In one example, a user can be provided with a selection of pre-defined color casts where selection of one of the pre-defined color casts can automatically set the color output of the flash unit. In another example, the user can be provided with a color output adjustment interface spanning the range of color outputs corresponding to the individual LED colors for fine adjustments of the output LED color.

Though the sensor response analysis and color temperature matching are discussed herein primarily in the context of a flash unit having three or more LEDs, such techniques can also be useful in some embodiments in cameras with flash units having two LEDs. Although the sensor response analysis is discussed herein as including R/G and B/G sensor response values, other values indicative of sensor response to colors can be used in other embodiments. Further, the examples provided focus on the RGB color space, as this is a commonly used color space for digital imaging. However, the sensor response analysis and color temperature matching techniques discussed herein can be applied to other color spaces as well.

Various embodiments will be described below in conjunction with the drawings for purposes of illustration. It should be appreciated that many other implementations of the disclosed concepts are possible, and various advantages can be achieved with the disclosed implementations.

Overview of Example Multi-LED Flash Units

Figure 1B:
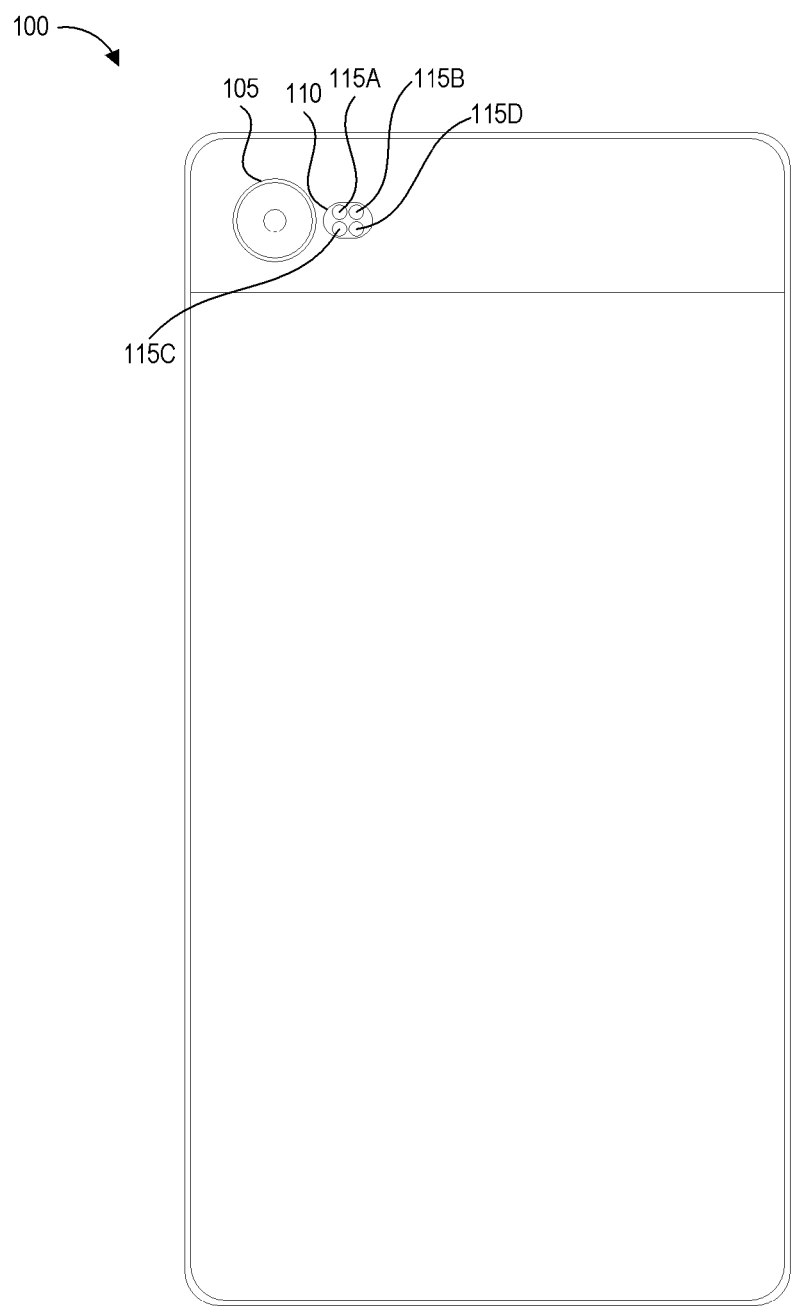
Figure 1C:
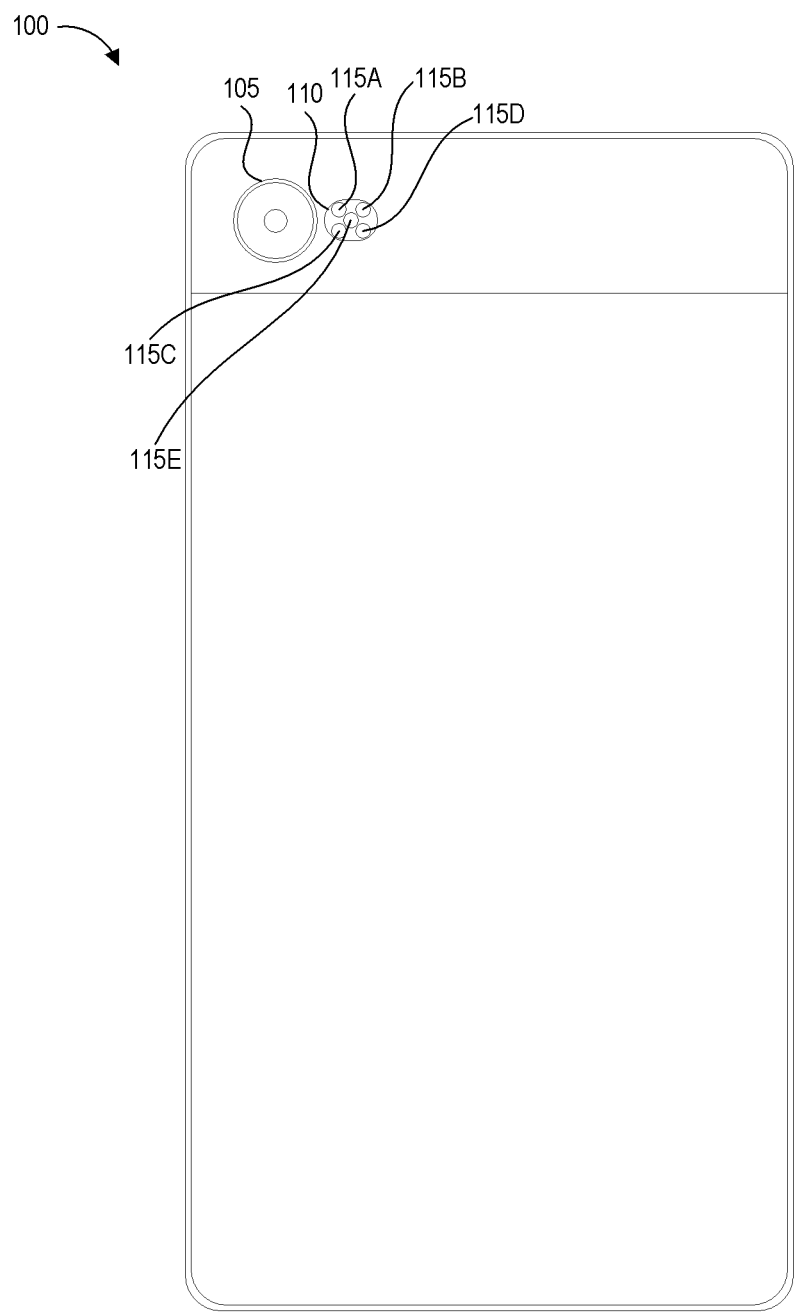

FIGS. 1A through 1C illustrate various embodiments of an image capture device 100 having a multi-LED flash unit. FIG. 1A illustrates an embodiment of an image capture device 100 having a three-LED flash unit 110 including a first LED 115A, second LED 115B, and third LED 115C. FIG. 1B illustrates an embodiment of the image capture device 100 having a four-LED flash unit 110 including a first LED 115A, second LED 115B, third LED 115C, and fourth LED 115D. FIG. 1C illustrates an embodiment of the image capture device having a three-LED flash unit 110 including a first LED 115A, second LED 115B, third LED 115C, fourth LED 115D, and fifth LED 115E. Thought not depicted, two LEDs and more than five LEDs are possible for inclusion in the flash unit in other embodiments.

Device 100 includes a camera aperture 105 and flash unit 110, and flash unit 110 includes a number of LEDs 115A-115E. Though discussed primarily herein as implementing LED light sources, flash unit 110 can implement any suitable light source, for example flash tubes and xenon flash lights, among others. The flash unit 110 is illustrated as being adjacent to the camera aperture 105, however the flash unit 110 and camera aperture 105 may be spaced apart in some embodiments. For example, the flash unit can in some embodiments be provided as a separate device from the device 100, for example an external flash unit. Such an external flash unit may communicate with device 100 regarding sensor response ratios for determining LED current and/or may be capable of independent reference illuminant CCT analysis. The flash unit 110 also includes electronic circuitry (not shown) for providing a selected current to some or all of the LEDs 115A-115E.

The illustrated configurations are provided for purposes of example and not limitation, and other configurations are possible. The LEDs can be arranged in any configuration that provides a substantially homogenous blend of the output colors from each LED, in order to avoid causing uneven color casting across different portions of captured images. For example, in some embodiments as illustrated the LEDs can be placed in close proximity to achieve a substantially homogenous blend of the output colors from each LED. In some embodiments, the LEDs can be angled in order to provide overlapping output areas and a substantially homogenous blend. In some embodiments, the flash unit 110 may comprise reflectors or a lens in order to blend the output LED colors into a substantially homogenous output color.

Device 100 is illustrated as a portable computing device, however device 100 can take the form of any device having image capture capabilities for example a smartphone, digital camera, tablet computer, laptop computer, personal computer, web camera, gaming console, photo booth, or the like. Device 100 may include internal components relating to color matching techniques for example memory components, one or more processors, and modules storing instructions relating to the color matching techniques, as discussed in more detail below with respect to device 700.

Overview of Example Sensor Response Analysis

Figure 2:
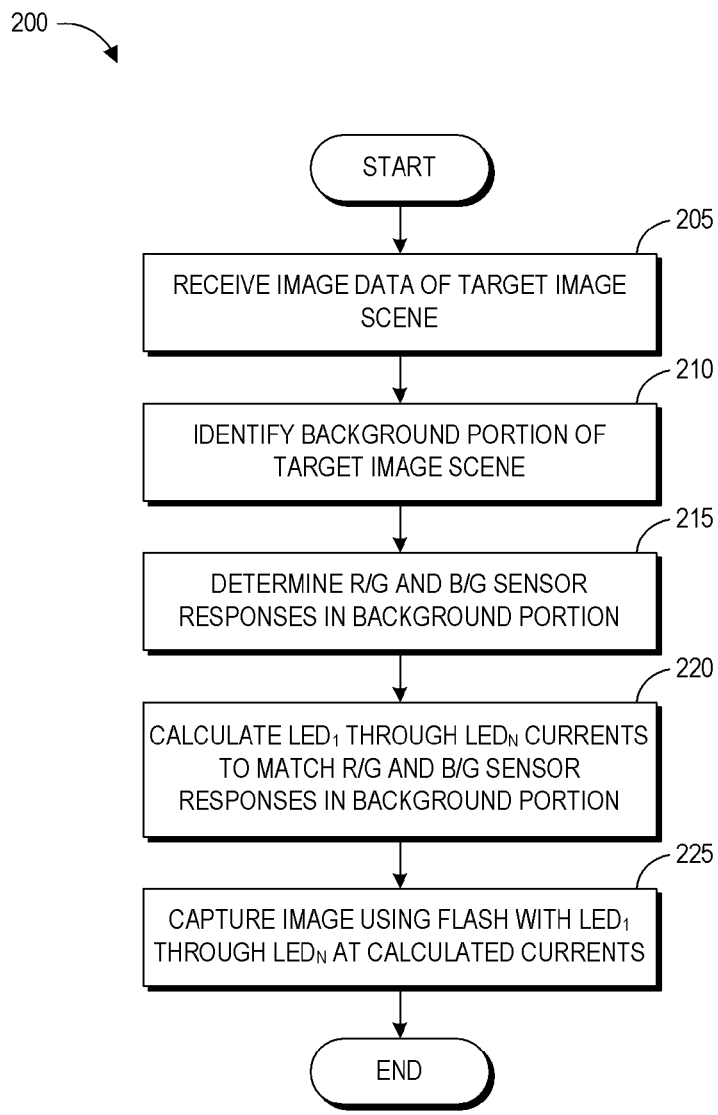
FIG. 2 illustrates a flowchart of an embodiment of an image capture process using the color temperature matching techniques described herein.

FIG. 2 illustrates a flowchart of an embodiment of an image capture process 200 using the sensor response analysis and color temperature matching techniques described herein. The process 200 can be executed by device 100 described above, device 700 described below, or any other device equipped with sensor response analysis and color temperature matching capabilities.

The process 200 begins at block 205 at which the process 200 receives image data of a preliminary image of a target image scene. The preliminary image can include preview image data in some embodiments. For example, a digital camera can implement a live preview feature. Live preview is a feature that allows a digital camera's display screen to be used as a viewfinder, providing a user with a means of previewing framing and other exposure before taking the photograph. The preview is typically generated by continuously and directly projecting the image formed by the lens onto the main image sensor, which in turn feeds the electronic screen with the live preview image. Such a live preview can be continuously or intermittently analyzed according to the process 200, or can be analyzed in response to user indication that image capture is desired (for example, activating a shutter button or providing another image capture command). In other embodiments, the preliminary image can be a first captured image of a scene, for example an image captured in response to user indication that image capture is desired, in some embodiments during a pre-flash.

At block 210 the process 200 identifies a background portion of the target image scene. As discussed above, when flash is used to capture an image, the background portion of the image is likely to still be completely or substantially illuminated by the reference illuminant. Accordingly, it can be advantageous for white balancing a captured image to match the color output of the flash unit to the sensor response to the color temperature of the reference illuminant illuminating the background. Some embodiments of the process 200 may identify one or more pixels as a background portion of the image, for example through depth analysis, feature identification, or other suitable techniques. In some embodiments block 210 may be optional.

At block 215 the process 200 determines the R/G and B/G sensor responses in a determined region, which in some embodiments is the determined background portion. The determined region may be adaptively located based on analysis of the captured image data in some examples, for example location of a grey pixel or pixels and/or location of a background portion. White balance processes can be used to identify such pixel regions in some embodiments. In some embodiments, the R/G and B/G sensor responses can be determined for a grey area, and the determined region can be a block or group of pixels determined to have grey color values. The grey pixels can be in the background portion of the image. However, in some examples an image may contain no grey pixels, and accordingly the determined region may include non-grey pixels and the sensor response can be determined from non-grey pixels. The non-gray pixels can be from a region identified, for example, by a white balance process as being similar or close in color value to grey pixels. In other embodiments, the process 200 determines the R/G and B/G sensor responses in the entire image or over a different portion of the image. R/G represents the red-to-green ratio in the determined region and B/G represents the blue-to-green ratio in the determined region.

The R/G and B/G sensor responses can be determined based on interpolated pixel values or based on raw sensor data for some or all pixels in the determined region. In some embodiments, the determined R/G and B/G sensor responses can be compared with stored sensor response values under a variety of lighting conditions to determine whether the preliminary image contains a color cast associated with a reference illuminant. In some embodiments, the values of the determined R/G and B/G sensor responses can be analyzed (i.e., compared to thresholds associated with various color casts) to determine whether the preliminary image contains a color cast associated with a reference illuminant.

At block 220, currents can be calculated for $LED_1$ through $LED_N$, representing the N LEDs in the flash unit, in order to match the output color of the flash unit to the determined sensor response to the color temperature of the reference illuminant. In some embodiments, the determined currents can be based on stored testing results indicating the actual sensors response to the actual output color of one or a combination of the LEDs. For example, the currents may be determined via a table lookup associating reference illuminant color temperature (as indicated by sensor response values) with correlated $LED_1$ through $LED_N$ currents that will produce a matching or substantially matching output color.

At block 225, the process 200 captures an image using flash with $LED_1$ through $LED_N$ set at the calculated currents. Accordingly, the foreground of the image scene will be illuminated by light emitted from the flash module at the determined output color, and the background of the image scene will be illuminated by the reference illuminant, which should match or approximately match due to the sensor response analysis and color matching described above. Though not illustrated, the process 200 may subsequently perform white balancing on the captured image. Performance of the white balance process is likely to be enhanced relative to performance on an image having foreground and background portions captured under different color illuminations, providing for more accurate (i.e., similar to the white balance that is perceived by the human eye) and uniform (i.e., a single color cast, if any, to the image) results.

Overview of Example Output Color Ranges

Figure 3:
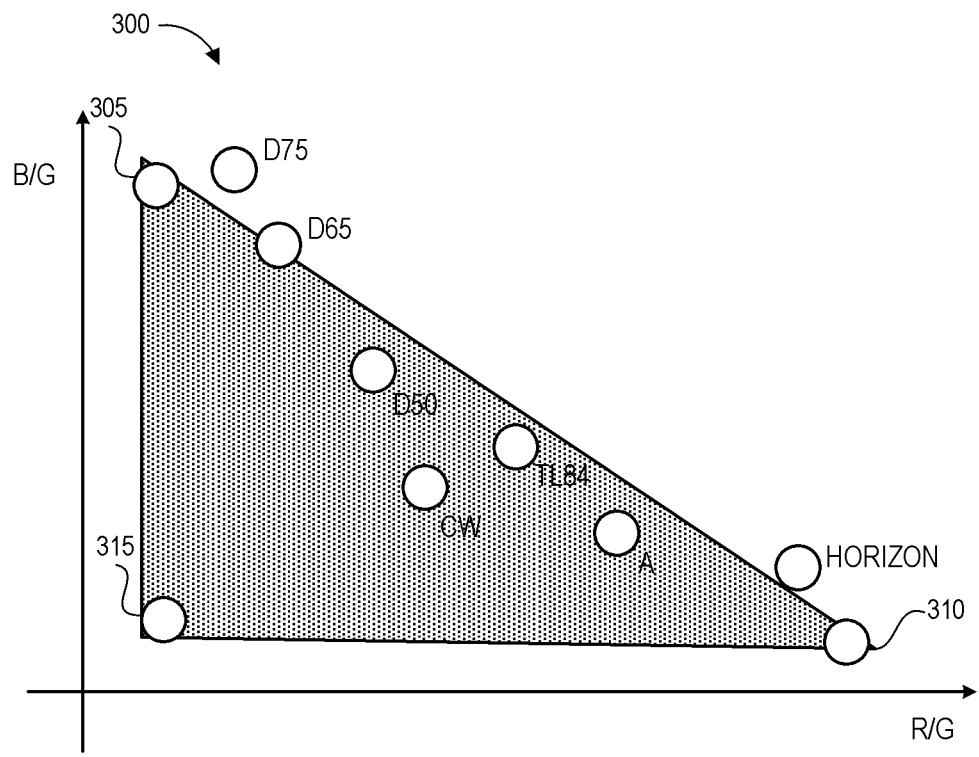
FIG. 3 illustrates an embodiment of a range of color temperature outputs of a three LED flash unit compared to CCT values of common reference illuminants.

FIG. 3 illustrates a two-dimensional graphical representation 300 of an embodiment of a range of combined color outputs of a three LED flash unit (represented by the shaded triangular region) compared to sensor responses to common reference illuminants having different CCT values.

Color temperature can be characterized by the amount of red, green, and blue light emitted from a reference illuminant. FIG. 3 illustrates the sensor responses to the color temperatures of various reference illuminants plotted on a 2D axis with blue (B/G) and red (R/G) normalized by the amount of green. The illustrated reference illuminants correspond to the following black-body temperatures in Kelvin as listed in Table 1. In general, the hotter the temperature, the cooler or whiter the appearance of the reference illuminant, and the colder the temperature, the "warmer" or "amberish" the appearance of the reference illuminant.

TABLE 1

| Reference Illuminant | Color Temperature |
|---|---|
| D75 | 7500 K |
| D65 | 6500 K |
| D50 | 5000 K |
| CW | 4200 K |
| A | 2850 K |
| Horizon | 2350 K |

As is illustrated by the distribution of the reference illuminant color temperatures in the graph 300, when using only one LED with a single output color, images captured under many ambient lighting environments will exhibit strong color casts due to gross errors in matching the LED combined output color to the sensor response to the reference illuminant CCT. With two LEDs (for example $LED_1$ 305 and $LED_2$ 310), the proportion of current to and corresponding luminance of each LED can be controlled to allow a linear range of possible output colors to better match the ambient environment. However, images captured under some ambient lighting environments (i.e., D75, D65, Horizon, and CW) would still exhibit color casts due to errors in the matching the LED combined output color to the sensor response to the reference illuminant CCT. Provision of three LEDs allows for even finer tuning of combined output color, allowing the flash unit output color to match sensor responses to a greater number of ambient lighting environments. In some examples where the flash unit output color does not match the sensor response to the black-body temperature of the reference illuminant, white balance interpolation can be used for compensation. For example, color matching to the determined sensor responses can be used together with white balance gain interpolation (such as is similar to that used in typical single LED flash systems) based on auto-exposure control sensitivity output.

The three LED flash unit includes $LED_1$ 305, $LED_2$ 310, and $LED_3$ 315. In some embodiments, $LED_1$ 305 can be chosen having a cool bluish color (high CCT around 5500-6500K), $LED_2$ 310 can be chosen having a warm yellowish color (low CCT around 2000-2500K), and $LED_3$ 315 can be chosen having a greenish color (not suitably represented by a CCT). $LED_3$ 315 can be activated, at varying, adaptively-selected current levels, in order to bias the linear range of the combination of $LED_1$ 305 and $LED_2$ 310 toward reference illuminants outside of the linear range between $LED_1$ 305 and $LED_2$ 310. For example, $LED_3$ 315 can be activated to bias the linear combination of $LED_1$ 305 and $LED_2$ 310 toward the CW reference illuminant. Other combinations of $LED_1$ 305, $LED_2$ 310, and $LED_3$ 315 can be adaptively illuminated as needed to match a determined sensor response to the reference illuminant, for example a sensor response determined from a preliminary image of a target image scene. A preliminary image may be a preview image or a pre-flash image in various embodiments.

The specific locations of the individual $LED_1$ 305, $LED_2$ 310, and $LED_3$ 315 R/G and B/G values relative to the sensor responses to reference illuminant color temperatures on the graph 300 provides just one example of LED colors that can be selected. For example, in some embodiments $LED_1$ 305 and $LED_2$ 310 can be selected to have a linear range passing through D75 and Horizon, and therefore together with $LED_3$ 315 the flash unit could match each of the illustrated ambient lighting environments. In some embodiments, the R/G and B/G color values of $LED_3$ 315 can be selected to enable biasing of the linear output of $LED_1$ 305 and $LED_2$ 310 with a minimal amount of current. For example, if the color of $LED_3$ 315 is selected to be farther from (e.g., more saturated than) the color of the reference illuminants, then less current can be required to bias the output color of $LED_1$ 305 and $LED_2$ 310.

Figure 4:
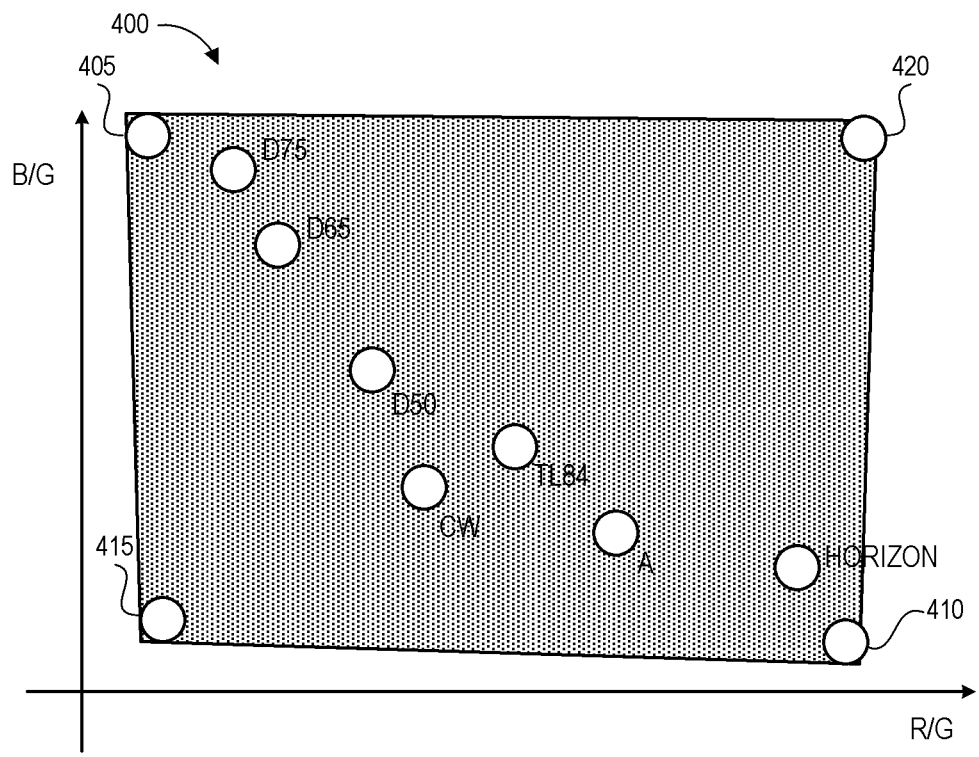
FIG. 4 illustrates an embodiment of a range of color temperature outputs of a four LED flash unit compared to CCT values of common reference illuminants.

FIG. 4 illustrates a two-dimensional graphical representation 400 of an embodiment of a range of combined color outputs of a four LED flash unit (represented by the shaded quadrilateral region) compared to sensor response to common reference illuminants having different CCT values. The illustrated reference illuminants correspond to the black-body temperature values detailed above in Table 1. As illustrated by the shaded area of the color output range, with four LEDs the camera flash output can match sensor responses to every ambient color temperature, providing optimal image color correction and white balancing.

The four LED flash unit includes $LED_1$ 405, $LED_2$ 410, $LED_3$ 415, and $LED_4$ 420. In some embodiments, $LED_1$ 405 can be chosen having a cool bluish color (high CCT around 5500-6500K), $LED_2$ 410 can be chosen having a warm yellowish color (low CCT around 2000-2500K), $LED_3$ 415 can be chosen having a greenish color (not suitably represented by a CCT), and $LED_4$ 420 can be chosen having a purplish color (not suitably represented by a CCT). The linear output of $LED_1$ 405 and $LED_2$ 410 can be biased in either direction as needed by selectively applying an adaptively-selected current amount to $LED_3$ 415 or $LED_4$ 420. Other combinations of $LED_1$ 405, $LED_2$ 410, $LED_3$ 415, and $LED_4$ 420 can be adaptively illuminated as needed to match a determined sensor response of a preliminary image of a target image scene.

The specific locations of the $LED_1$ 405, $LED_2$ 410, $LED_3$ 415, and $LED_4$ 420 R/G and B/G values relative to the sensor responses to reference illuminant color temperatures on the graph 400 provides just one example of LED colors that can be selected. In some embodiments, the R/G and B/G color values of $LED_3$ 415 and/or $LED_4$ 420 can be selected to enable biasing of the linear output of $LED_1$ 305 and $LED_2$ 310 with a minimal amount of current. For example, if the color of $LED_3$ 415 or $LED_4$ 420 is selected to be farther from (e.g., more saturated than) the color of the reference illuminants, then less current can be required to bias the output color of $LED_1$ 405 and $LED_2$ 410.

Figure 5:
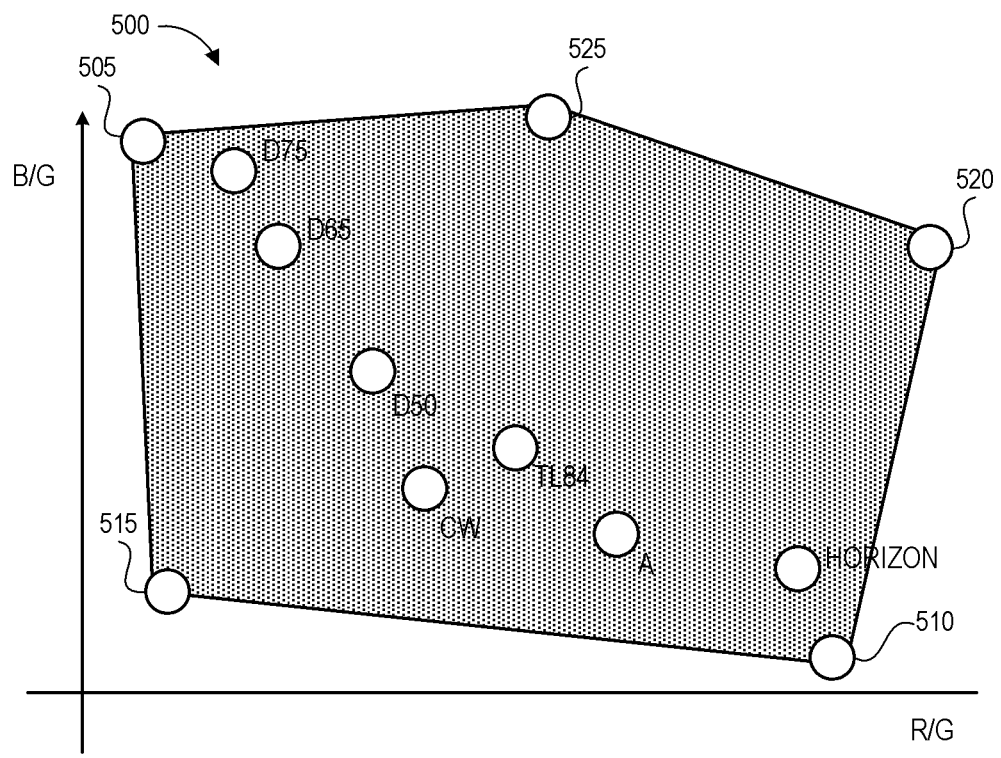
FIG. 5 illustrates an embodiment of a range of color temperature outputs of a five LED flash unit compared to CCT values of common reference illuminants.

FIG. 5 illustrates a two-dimensional graphical representation 500 of an embodiment of a range of combined color outputs of a five LED flash unit (represented by the shaded pentagonal region) compared to sensor responses to common reference illuminants having different CCT values. The illustrated reference illuminants correspond to the black-body temperature values detailed above in Table 1. Though depicted with five LEDs ($LED_1$ 505, $LED_2$ 510, $LED_3$ 515, $LED_4$ 520, and $LED_5$ 525), the multi-LED color mixing scheme can be generalized to any N number of LEDs with different output color characteristics to customize the possible tuning range for camera flash output color depending on the application.

Overview of Example Pre-Flash Analysis

Figure 6:
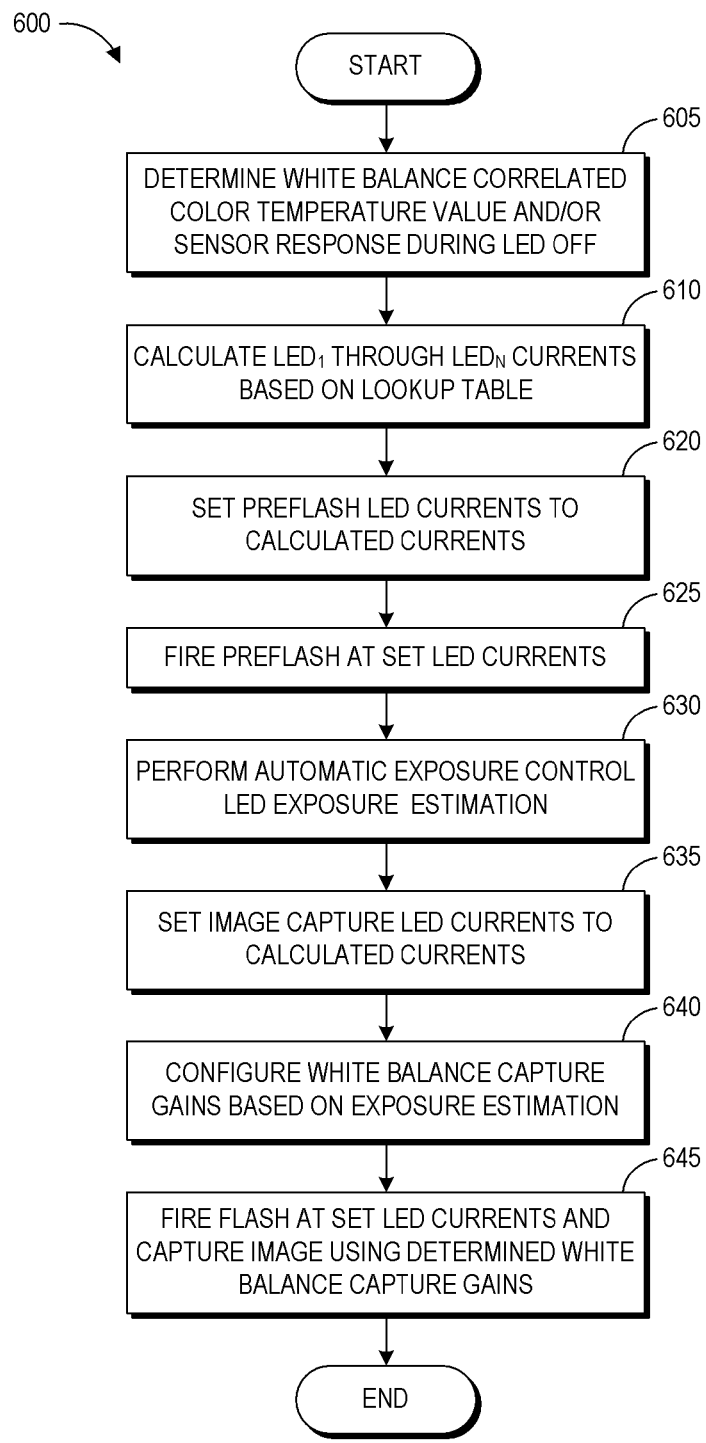
FIG. 6 illustrates a flowchart of an embodiment of a pre-flash image capture process using the color temperature matching techniques described herein.

FIG. 6 illustrates a flowchart of an embodiment of a pre-flash image capture process 600 using the color temperature matching techniques described herein. The process 600 can be executed by device 200 described above, device 700 described below, or any other device equipped with sensor response analysis and color temperature matching capabilities.

At block 605, the process 600 determines white balance CCT values and/or sensor responses while the flash unit is off. This can be accomplished, in some examples, by blocks 205-215 of process 200 described above to determine R/G and B/G ratios and to use these sensor response ratios to determine a CCT of the reference illuminant.

At block 610, the process 600 calculates currents for $LED_1$ through $LED_N$, representing the N LEDs in the flash unit, in order to match the output color of the flash unit to the determined sensor response to the color temperature of the reference illuminant. This can be accomplished, in some embodiments, similar to block 220 of process 200. For example, a look-up table can be used to determine the currents needed to match sensor response to an identified reference illuminant. The look-up table can be based on test data for the particular sensor and LEDs of the camera in some embodiments. In other embodiments, the look-up table may be built based on other data, for example intended manufacturing parameters of one or both of the sensor and LEDs.

At block 620, the pre-flash currents are set to the determined $LED_1$ through $LED_N$ currents. For example, in some cameras the flash exposure measuring logic fires a pre-flash very quickly before the real flash used to capture the final image. In some cameras, one or more pre-flashes may be fired shortly before the real flash in order to contract a subject's irises slightly, thereby mitigating or avoiding the "red-eye" effect. Such pre-flashes can provide a useful tool for refining color matching between detected reference illumination and the flash unit output color.

Using the determined currents for $LED_1$ through $LED_N$, at block 625 a pre-flash is fired and a pre-flash image is captured. In some embodiments, multiple pre-flashes may be fired for red-eye reduction, and accordingly multiple pre-flash frames can be captured. In some examples, each of the multiple pre-flash frames can be captured with different exposure settings. These multiple pre-flash frames can later be used by the exposure control estimation, and potentially also to refine color matching.

The process 600 then transitions to block 630, at which automatic exposure control LED exposure estimation is performed. An automatic exposure control (AEC) process is capable of controlling both the camera exposure timing and the amount or intensity of illumination to be emitted by the multi-LED flash unit in order to achieve a properly exposed image. For example, if the pre-flash image is over-exposed, then the AEC process can reduce the exposure time and/or reduce the intensity of the flash unit (i.e., proportionally reduce the current supplied to each LED in the flash unit). As another example, if the pre-flash image is under-exposed, then the AEC process can increase the exposure time and/or increase the intensity of the flash unit (i.e., proportionally increase the current supplied to each LED in the flash unit). Accordingly, in some embodiments at block 620 the process 600 may provide a ratio between LED currents and an initial intensity of each LED current, and at block 630 the process may adjust the current value while maintaining the ratio between the LED currents.

Optionally, the pre-flash image can be used to test how the combined output color generated based on the determined currents for $LED_1$ through $LED_N$ matches, with respect to white balance, with the sensor response to the reference illuminant. For example, a foreground region and a background region of the pre-flash image can be identified, and R/G and B/G sensor responses can be determined for a grey area in each of the foreground and background regions. In some images, if no grey area is determined to be in one or both of the foreground and background, then a near-gray or other area can be used. If a difference in sensor responses between the foreground and background regions exceeds a threshold, then the difference can be used to further refine the combined output color of the flash unit to better match the reference illuminant. Accordingly, the ratio between LED currents can be adjusted while, in some examples, maintaining a flash intensity determined by the AEC process.

At block 635, the process 600 sets the currents for $LED'_1$ through $LED_N$ according to block 620 with any adjustments determined at block 630.

The process 600 then transitions to block 640 to determine white balance capture gains based at least partly on the AEC estimation. The white balance capture gains can be based at least partly on the determined sensor response to one or both of the reference illuminant and the LED flash in some embodiments.

At block 645, the process 600 captures an image using flash with $LED_1$ through $LED_N$ set at the calculated currents. Accordingly, the foreground of the image scene will be illuminated by light emitted from the flash module at the determined output color, and the background of the image scene will be illuminated by the reference illuminant, which should match or approximately match due to the sensor response analysis and color matching described above.

Overview of Example Color Temperature Matching Device

Figure 7:
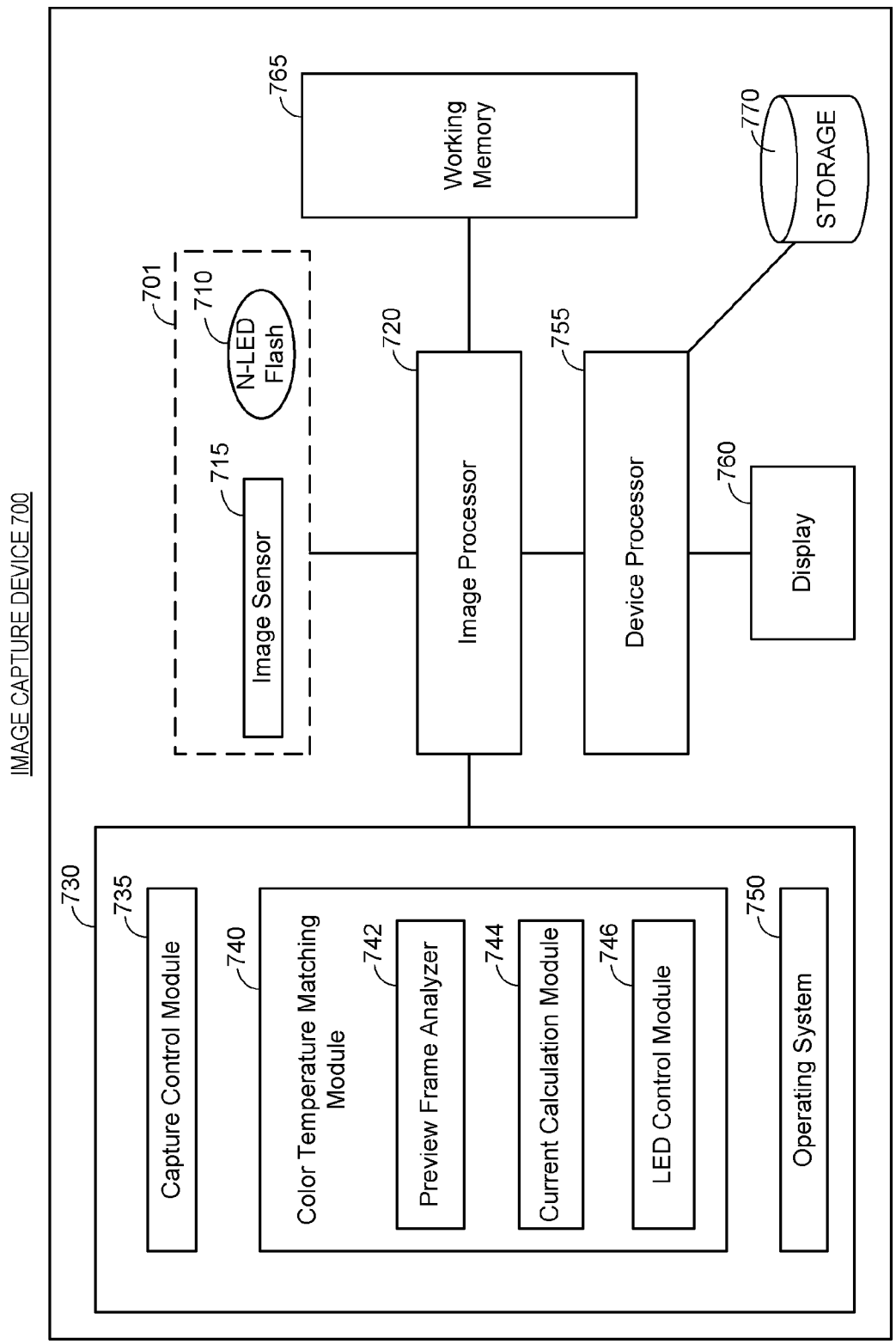
FIG. 7 illustrates a high-level schematic diagram of an embodiment of an image capture device with color temperature matching capabilities.

FIG. 7 illustrates a high-level schematic diagram of an embodiment of an image capture device 700 with color temperature matching capabilities, the device 700 having a set of components including an image processor 720 linked to a camera 701. The image processor 720 is also in communication with a working memory 765, memory 730, and device processor 755, which in turn is in communication with storage 770 and an optional electronic display 760.

Device 700 may be a portable personal computing device, e.g. a mobile phone, digital camera, tablet computer, personal digital assistant, or the like. Device 700 may be device 100 described above. There are many portable computing devices in which using the color temperature matching techniques as described herein would provide advantages. Device 700 may also be a stationary computing device or any device in which the color temperature matching techniques would be advantageous. A plurality of applications may be available to the user on device 700. These applications may include traditional photographic and video applications as well as applications relating to adjusting the combined output color of the LED flash module, for example a user interface for selecting from pre-defined color casts or a user interface for manually adjusting output LED color.

The image capture device 700 includes camera 701 for capturing external images. The camera 701 can include an image sensor 715 and a N-LED flash unit 710. The N-LED flash unit can have two, three, four or more different colored LEDs as described above. The camera 701 can be configured for continuous or intermittent capture of preview frames and pre-flash image capture, as well as capture of full resolution final images.

The image processor 720 may be configured to perform various processing operations on received preview frames in order to execute color temperature matching techniques. Processor 720 may be a general purpose processing unit or a processor specially designed for imaging applications. Examples of image processing operations include AWB and AEC data generation, LED current calculation, cropping, scaling (e.g., to a different resolution), image stitching, image format conversion, color interpolation, color processing, image filtering (e.g., spatial image filtering), lens artifact or defect correction, etc. Processor 720 may, in some embodiments, comprise a plurality of processors. Processor 720 may be one or more dedicated image signal processors (ISPs) or a software implementation of a processor.

As shown, the image processor 720 is connected to a memory 730 and a working memory 765. In the illustrated embodiment, the memory 730 stores capture control module 735, color temperature matching module 740, and operating system 750. The modules of the memory 730 include instructions that configure the image processor 720 of device processor 755 to perform various image processing and device management tasks. Working memory 765 may be used by image processor 720 to store a working set of processor instructions contained in the modules of memory 730. Alternatively, working memory 765 may also be used by image processor 720 to store dynamic data created during the operation of device 700.

Color temperature matching module 740 can store submodules preview frame analyzer 742, current calculation module 744, and LED control module 746 in some embodiments. Together, these modules can cooperate to perform the sensor response analysis and color temperature matching techniques.

Preview frame analyzer 742 can be configured to store instructions that configure the processor 720 to analyze a preliminary image, for example a preview frame or pre-flash frame, to identify the estimated CCT of a reference illuminant of an image scene based on a determined sensor response. As described above, the determined sensor response may be based on R/G and B/G ratios (or other normalized color values for color spaces other than RGB) for all of the preliminary image or for a determined portion (i.e., background or foreground) of the preliminary image.

Current calculation module 744 can be configured to store instructions that configure the processor 720 to determine current values and/or a ratio between current values for the current that will be provided to each LED in the N-LED flash unit 710. In some embodiments, current calculation may be accomplished via a table-lookup based on the estimated CCT of a reference illuminant determined by preview frame analyzer 742. In some embodiments, current calculation can be adaptively determined, for example based on an equation or set of equations defining the relationship between relative intensities of the N-LEDs and the output color of the flash unit 710.

LED control module 746 can be configured to store instructions that configure the processor 720 to control the LEDs in the N-LED flash unit 710. For example, the LED control module 746 may instruct the processor 720 to provide a specific current amount for a predetermined timing (e.g., based on AEC) to some or each of the N-LEDs.

As mentioned above, the image processor 720 is configured by several modules stored in the memories. The capture control module 735 may include instructions that configure the image processor 720 to adjust the focus position of camera 701. Capture control module 735 may further include instructions that control the overall image capture functions of the device 700. For example, capture control module 735 may include instructions that call subroutines to configure the image processor 720 to capture preview image data including one or more frames of a target image scene using the camera 701. In one embodiment, capture control module 735 may then call the color temperature matching 740 to perform sensor response analysis and color temperature matching.

Operating system module 750 configures the image processor 720 to manage the working memory 765 and the processing resources of device 700. For example, operating system module 750 may include device drivers to manage hardware resources for example the camera 701. Therefore, in some embodiments, instructions contained in the image processing modules discussed above may not interact with these hardware resources directly, but instead interact through standard subroutines or APIs located in operating system component 750. Instructions within operating system 750 may then interact directly with these hardware components. Operating system module 750 may further configure the image processor 720 to share information with device processor 755.

Device processor 755 may be configured to control the display 760 to display the captured image, or a preview of the captured image, to a user. The display 760 may be external to the imaging device 200 or may be part of the imaging device 200. The display 760 may also be configured to provide a view finder displaying a preview image for a use prior to capturing an image, for example present the user with a visual representation of the color cast or with a user interface for manually adjusting the output flash unit color. The display 760 may comprise an LCD or LED screen, and may implement touch sensitive technologies.

Device processor 755 may write data to storage module 770, for example data representing captured images and row sum values and comparisons. While storage module 770 is represented graphically as a traditional disk device, those with skill in the art would understand that the storage module 770 may be configured as any storage media device. For example, the storage module 770 may include a disk drive, e.g. a floppy disk drive, hard disk drive, optical disk drive or magneto-optical disk drive, or a solid state memory e.g. a FLASH memory, RAM, ROM, and/or EEPROM. The storage module 770 can also include multiple memory units, and any one of the memory units may be configured to be within the image capture device 700, or may be external to the image capture device 700. For example, the storage module 770 may include a ROM memory containing system program instructions stored within the image capture device 700. The storage module 770 may also include memory cards or high speed memories configured to store captured images which may be removable from the camera. The storage module 770 can also be external to device 700, and in one example device 700 may wirelessly transmit data to the storage module 770, for example over a network connection.

Although FIG. 7 depicts a device having separate components to include a processor, imaging sensor, and memory, one skilled in the art would recognize that these separate components may be combined in a variety of ways to achieve particular design objectives. For example, in an alternative embodiment, the memory components may be combined with processor components, for example to save cost and/or to improve performance.

Additionally, although FIG. 7 illustrates two memory components, including memory component 720 comprising several modules and a separate memory 765 comprising a working memory, one with skill in the art would recognize several embodiments utilizing different memory architectures. For example, a design may utilize ROM or static RAM memory for the storage of processor instructions implementing the modules contained in memory 730. The processor instructions may be loaded into RAM to facilitate execution by the image processor 720. For example, working memory 765 may comprise RAM memory, with instructions loaded into working memory 765 before execution by the processor 720.

Implementing Systems and Terminology

Implementations disclosed herein provide systems, methods and apparatus for color temperature analysis and matching. One skilled in the art will recognize that these embodiments may be implemented in hardware, software, firmware, or any combination thereof.

In some embodiments, the circuits, processes, and systems discussed above may be utilized in a wireless communication device. The wireless communication device may be a kind of electronic device used to wirelessly communicate with other electronic devices. Examples of wireless communication devices include cellular telephones, smart phones, Personal Digital Assistants (PDAs), e-readers, gaming systems, music players, netbooks, wireless modems, laptop computers, tablet devices, etc.

The wireless communication device may include one or more image sensors, two or more image signal processors, a memory including instructions or modules for carrying out the CNR process discussed above. The device may also have data, a processor loading instructions and/or data from memory, one or more communication interfaces, one or more input devices, one or more output devices such as a display device and a power source/interface. The wireless communication device may additionally include a transmitter and a receiver. The transmitter and receiver may be jointly referred to as a transceiver. The transceiver may be coupled to one or more antennas for transmitting and/or receiving wireless signals.

The wireless communication device may wirelessly connect to another electronic device (e.g., base station). A wireless communication device may alternatively be referred to as a mobile device, a mobile station, a subscriber station, a user equipment (UE), a remote station, an access terminal, a mobile terminal, a terminal, a user terminal, a subscriber unit, etc. Examples of wireless communication devices include laptop or desktop computers, cellular phones, smart phones, wireless modems, e-readers, tablet devices, gaming systems, etc. Wireless communication devices may operate in accordance with one or more industry standards such as the 3rd Generation Partnership Project (3GPP). Thus, the general term "wireless communication device" may include wireless communication devices described with varying nomenclatures according to industry standards (e.g., access terminal, user equipment (UE), remote terminal, etc.).

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

Headings are included herein for reference and to aid in locating various sections. These headings are not intended to limit the scope of the concepts described with respect thereto. Such concepts may have applicability throughout the entire specification.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. An image capture system comprising:
   an image sensor configured to capture image data of a target image scene;
   a flash unit comprising a plurality of LEDs;
   a memory that stores instructions; and
   a processor that executes the instructions to cause the image capture system to:
   receive image data comprising a preliminary image of the target image scene;
   analyze a background of the preliminary image in isolation to determine a plurality of color sensor response ratios for a reference illuminant of a background of the target image scene;
   determine a current amount for each of the plurality of LEDs such that a flash output color of the plurality of LEDs has sensor response ratios the same as or similar to the plurality of color sensor response ratios for the reference illuminant of the background of the target image scene;
   activate each of the plurality of LEDs at their determined current amounts to provide the flash output color; and
   capture a final image of the target image scene.

2. The image capture system of claim 1, wherein the plurality of color sensor response ratios includes red/green (R/G) and blue/green (B/G) sensor response ratios.

3. The image capture system of claim 1, wherein execution of the instructions causes the image capture system to further:
   activate each of the plurality of LEDs at their determined current amounts to provide the flash output color as a pre-flash; and
   capture at least one pre-flash image using the pre-flash.

4. The image capture system of claim 3, wherein execution of the instructions causes the image capture system to further:
   analyze the at least one pre-flash image to determine whether sensor responses to the flash output color match or approximately match the plurality of color sensor response ratios for the reference illuminant.

5. The image capture system of claim 3, wherein execution of the instructions causes the image capture system to further:
   identify pixels corresponding to a foreground portion of the pre-flash image;
   determine first color sensor response ratios for at least some of the pixels corresponding to the foreground portion of the pre-flash image;
   identify pixels corresponding to a background portion of the pre-flash image;
   determine second color sensor response ratios for at least some of the pixels corresponding to the background portion of the pre-flash image; and
   calculate a difference between the first color sensor response ratios and the second color sensor response ratios.

6. The image capture system of claim 5, wherein execution of the instructions causes the image capture system to further:
   calculate, in response to a determination that the difference exceeds a threshold, an adjusted flash output color based on the flash output color.

7. The image capture system of claim 6, wherein execution of the instructions causes the image capture system to capture the final image using the adjusted flash output color.

8. The image capture system of claim 5, wherein execution of the instructions causes the image capture system to further:
   determine to provide current to only a portion of the plurality of LEDs.

9. The image capture system of claim 1, wherein execution of the instructions causes the image capture system to provide a different current amount to each of the plurality of LEDs.

10. A method comprising:
    receiving image data comprising a preliminary image of a target image scene;
    analyzing a background of the preliminary image in isolation to determine a plurality of color sensor response ratios for a reference illuminant of a background of the target image scene;
    determining a current amount for each of a plurality of LEDs in a flash unit such that a flash output color of the plurality of LEDs has sensor response ratios the same as or similar to the plurality of color sensor response ratios for the reference illuminant of the background of the target image scene;
    activating each of the plurality of LEDs at their determined current amounts to provide the flash output color; and
    capturing a final image of the target image scene.

11. The method of claim 10, wherein the plurality of color sensor response ratios includes red/green (R/G) and blue/green (B/G) sensor response ratios.

12. The method of claim 10, further comprising activating each of the plurality of LEDs at their determined current amounts to provide the flash output color as a pre-flash and capturing at least one pre-flash image using the pre-flash.

13. The method of claim 12, further comprising analyzing the at least one pre-flash image to determine whether sensor responses to the flash output color match or approximately match the plurality of color sensor response ratios for the reference illuminant.

14. The method of claim 12, further comprising:
    identifying pixels corresponding to a foreground portion of the pre-flash image;
    determining first color sensor response ratios for at least some of the pixels corresponding to the foreground portion of the pre-flash image;
    identifying pixels corresponding to a background portion of the pre-flash image;
    determining second color sensor response ratios for at least some of the pixels corresponding to the background portion of the pre-flash image; and
    calculating a difference between the first color sensor response ratios and the second color sensor response ratios.

15. The method of claim 14, further comprising calculating, in response to a determination that the difference exceeds a threshold, an adjusted flash output color based on the flash output color.

16. The method of claim 15, further comprising capturing the final image using the adjusted flash output color.

17. The method of claim 10, further comprising providing a different current amount to each of the plurality of LEDs.

18. The method of claim 10, further comprising determining to provide current to only a portion of the plurality of LEDs.

19. A non-transitory computer-readable medium storing instructions that, when executed by one or more processors of a device, cause the device to perform operations comprising:
    receiving image data comprising a preliminary image of a target image scene;

analyzing a background of the preliminary image in isolation to determine a plurality of color sensor response ratios for a reference illuminant of a background of the target image scene;

determining a current amount for each of a plurality of LEDs in a flash unit of the device such that a flash output color of the plurality of LEDs has sensor response ratios the same as or similar to the plurality of color sensor response ratios for the reference illuminant of the background of the target image scene;

activating each of the plurality of LEDs at their determined current amounts to provide the flash output color; and capturing a final image of the target image scene.

20. The non-transitory computer-readable medium of claim 19, the operations further comprising providing a different current amount to each of the plurality of LEDs.

21. The non-transitory computer-readable medium of claim 19, the operations further comprising determining to provide current to only a portion of the plurality of LEDs.

22. The non-transitory computer-readable medium of claim 19, wherein the plurality of color sensor response ratios includes red/green (R/G) and blue/green (B/G) sensor response ratios.

23. The non-transitory computer-readable medium of claim 19, the operations further comprising activating each of the plurality of LEDs at their determined current amounts to provide the flash output color as a pre-flash and capturing at least one pre-flash image using the pre-flash.

24. The non-transitory computer-readable medium of claim 23, the operations further comprising analyzing the at least one pre-flash image to determine whether sensor responses to the flash output color match or approximately match the plurality of color sensor response ratios for the reference illuminant.

25. The non-transitory computer-readable medium of claim 23, the operations further comprising:

identifying pixels corresponding to a foreground portion of the pre-flash image;

determining first color sensor response ratios for at least some of the pixels corresponding to the foreground portion of the pre-flash image;

identifying pixels corresponding to a background portion of the pre-flash image;

determining second color sensor response ratios for at least some of the pixels corresponding to the background portion of the pre-flash image; and calculating a difference between the first color sensor response ratios and the second color sensor response ratios.

26. The non-transitory computer-readable medium of claim 25, the operations further comprising calculating, in response to a determination that the difference exceeds a threshold, an adjusted flash output color based on the flash output color.

27. The non-transitory computer-readable medium of claim 26, the operations further comprising capturing the final image using the adjusted flash output color.

* * * * *